United States Patent

[11] 3,572,484

[72] Inventor Kenneth A. Richins
 Salt Lake City, Utah
[21] Appl. No. 775,889
[22] Filed Nov. 14, 1968
[45] Patented Mar. 30, 1971
[73] Assignee Eaton Yale & Towne Inc.
 Cleveland, Ohio

[54] CONTROL MECHANISM COMPRISING MOTOR
 AND BRAKES RESPONSIVE TO COUNTER MEANS
 8 Claims, 6 Drawing Figs.
[52] U.S. Cl.................................................... 192/142,
 33/141, 104/88, 192/3, 192/144, 214/16.4,
 307/129
[51] Int. Cl....................................................F16d 71/04,
 B65g 47/22
[50] Field of Search........................................... 192/142,
 144, 3, 2; 104/88; 33/141 (A); 318/470, 466;
 307/129; 214/16.4 (2)

[56] References Cited
UNITED STATES PATENTS
3,139,994 7/1964 Chasar .......................... 314/16.4(2)
3,213,715 10/1965 Arenson ....................... 318/470
3,318,260 5/1967 Gillespie....................... 104/88

Primary Examiner—Allen D. Herrmann
Attorney—Teagno & Toddy

ABSTRACT: A control mechanism for material carrying vehicles which includes track means for controlling the direction of travel of the vehicle, a roller rotatably secured to the vehicle to form a no-slip contact with the track and be rotated thereon when the vehicle moves along the track, drive means for propelling the vehicle, a counter driven by the roller for counting the roller revolutions, vehicle brakes for braking the movement of the vehicle, and activation circuit means electrically connected to the counter and to the brakes for setting the brakes when the roller has rotated a predetermined number of revolutions.

Patented March 30, 1971

INVENTOR.
KENNETH A. RICHINS

BY C. Harry Gold

ATTORNEY

Patented March 30, 1971

INVENTOR.
KENNETH A. RICHINS

BY C. Harry Gold

ATTORNEY

Patented March 30, 1971

INVENTOR.
KENNETH A. RICHINS
BY
ATTORNEY

CONTROL MECHANISM COMPRISING MOTOR AND BRAKES RESPONSIVE TO COUNTER MEANS

BACKGROUND OF THE INVENTION

This invention relates to a mechanism for controlling the operation of vehicles used to transport materials in warehousing complexes.

In recent years complex warehouse storage systems have evolved because of the great number of parts, materials, components, goods, and the like, which are temporarily stored before they are ultimately used by the consumer. The warehousing complexes are often many hundred feet long and items can be stacked therein from floor to ceiling. Because of the immense size of such complexes a stored item can be easily misplaced. In addition, even when the exact location of the stored inventory is known it is very time consuming, and accordingly expensive, to have a workman pick up the item as it is needed and take it to an unloading zone in the warehouse or move it from a pickup zone to a temporary storage location. As a result, many material carrying vehicles have been employed to minimize the time required to pick up and deposit inventory items in warehousing complexes. While vehicles of this type have proven to be useful for their intended purpose, substantial time is required in controlling their operation to stop and start at predetermined locations. Accordingly, a great need has arisen for a control mechanism which can precisely and automatically control the operation of the vehicle, and in some cases its elevating platform, over the entire route of operation of the vehicle.

SUMMARY OF THE INVENTION

This invention provides a mechanism for controlling the operation of material carrying vehicles in warehousing complexes.

In its broadest form, the invention comprises a measuring device for track-mounted warehousing vehicles which includes a roller rotatably secured to the vehicle to form a no-slip contact with the track and be rotated thereon as the vehicle moves along said track, and counter means driven by the roller for counting the revolutions of the roller to thereby measure the distance traveled by the vehicle.

In a preferred embodiment of the invention the counter means includes a rotary transducer driven by the roller and a reversible counter electrically connected to the transducer which counts the voltage pulses produced by the transducer as it is rotated.

In another embodiment of the invention the roller is a sprocket which coacts with a rack longitudinally attached to the track along its entire length.

In still another embodiment of the invention the vehicle is provided with brakes for braking the movement of the vehicle and activation means controlled by the counter means for setting the brakes when the vehicle has traveled a predetermined distance along the tracks.

BRIEF DESCRIPTION OF THE DRAWINGS

So that the invention may be more readily understood and carried into effect, reference is made to the accompanying drawings which are offered by way of example only and are not to be taken as limiting the invention, the scope of which is defined by the appended claims which are intended to embrace equivalent structures.

DESCRIPTION OF THE PREFERRED EMBODIMENT

Figure 2:
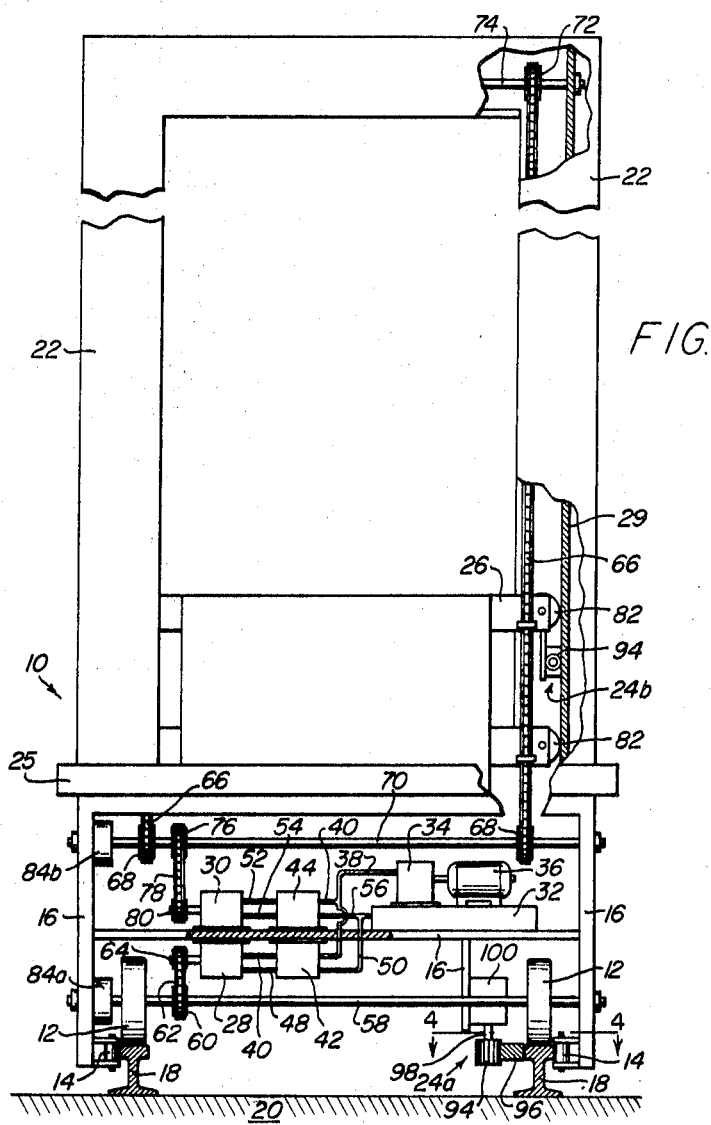
FIG. 2 is a front elevation view of the material carrying vehicle of this invention supported on floor mounted tracks. For purposes of clarity portions of the vehicle are shown broken away.
Figure 4:
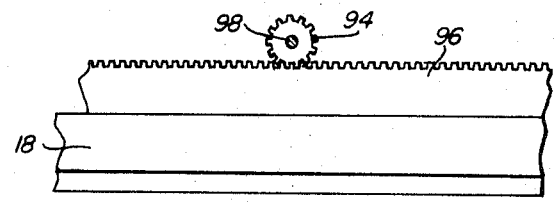
FIG. 4 is a top view of a portion of a vehicle support track having an attached rack positioned to coact with a no-slip counting sprocket.
Figure 3:
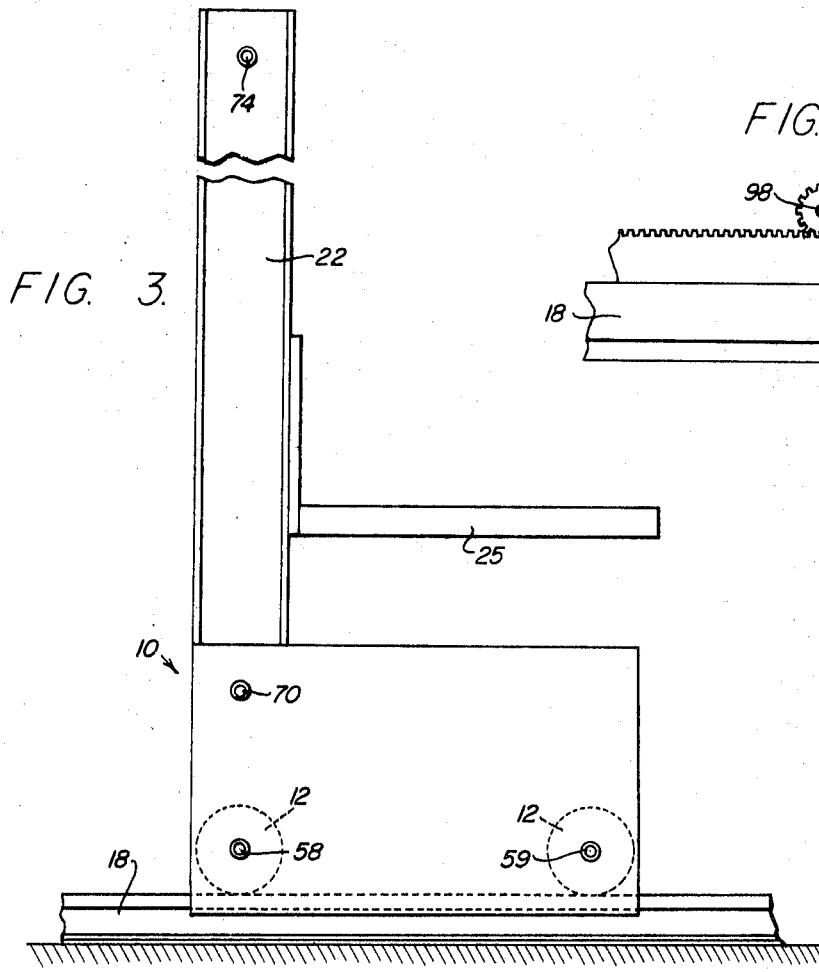
FIG. 3 is a side elevation view of the material carrying vehicle.

Referring now more particularly to the drawings, in FIGS. 2 and 3 there is shown a warehousing vehicle 10 of a type suited for use in this invention. It is to be noted that while the control and measuring mechanism of this invention is particularly suited for material carrying vehicles it can also be used in connection with other types of traction vehicles such as those used for pulling material carrying cars. Vehicle 10 is mounted on front and rear wheels 12 (shown in phantom in FIG. 3) which are positioned with rollers 14, secured to vehicle frame 16, to ride on the top face of spaced tracks 18. Preferably tracks 18 are supported on the floor 20 of a warehouse. Mast 22 is attached to the vehicle for supporting platform 25 used to raise and lower storage items to a predetermined level. A first incremental linear measuring device 24a, hereinafter described, is attached to frame 16 in a position to coact with track 18 and a second similar measuring device 24b is attached to platform support 26 to coact with the vertical rail 29 of mast 22 for measuring the movement of vehicle and platform.

Figure 5:
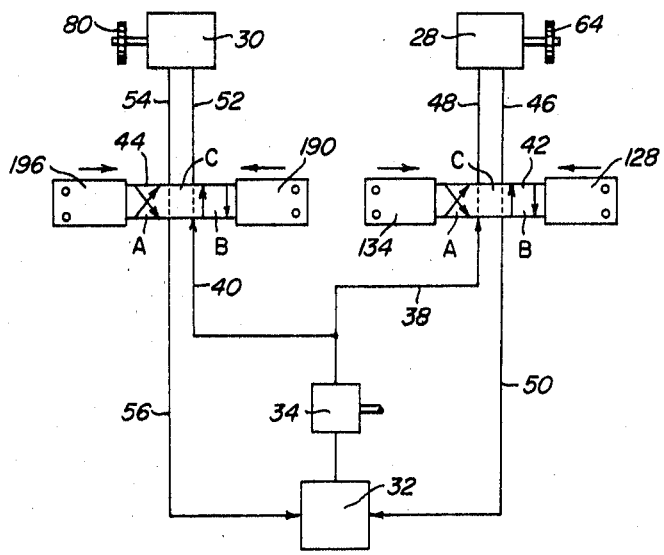
FIG. 5 is a schematic representation of a drive system suited for use by the material carrying vehicle.

Vehicle 10 is propelled along tracks 18 with a reversible hydraulic motor 28, which is preferably an adjustable speed one, and elevator platform 25 is raised and lowered through the use of a similar motor 30. The motors are hydraulic driven with fluid pumped from reservoir 32 with pump 34 driven with electric motor 36. From pump 34 fluid flows along lines 38 and 40 to reversing valves 42 and 44 respectively. As illustrated in FIG. 5, when valve 42 is in its A position hydraulic fluid passes through the valve into line 46 connected to motor 28 and then back to valve 42 through line 48. Conversely, when the valve is in its B position fluid flows to motor 28 through line 48 and thence back to valve 42 through line 46 thereby reversing the motor. Valve 44 works in a fashion identical to valve 42 in that hydraulic fluid can flow to motor 30 through either line 52 or 54. Fluid exhausted from motors 28 and 30, and their respective control valves 42 and 44, returns to reservoir 32 through lines 50 and 56.

As indicated, vehicle 10 is supported on front and rear wheels 12 which are positioned to ride on tracks 18. The wheels are keyed to shafts 58 and 59 which are in turn journaled at their opposite ends to the vehicle frame 16. A drive sprocket 60 is keyed to shaft 58 in a position to coact with drive chain 62 which is mounted on said sprocket 60 and the output drive sprocket of reversible drive motor 28. Accordingly, vehicle 10 is propelled along track 18 when motor 28 is activated.

Platform 25 is raised and lowered with chains 66 mounted on sprockets 68, keyed to shaft 70, and sprockets 72, keyed to support shaft 74. Shaft 70 is journaled at its opposite ends to frame 16 proximate the bottom of mast 22 and shaft 74 is similarly journaled to the mast proximate its top end. Sprocket 76 is also keyed to shaft 70 in a position to coact with chain 78 which is driven with the drive sprocket 80 of reversible drive motor 30. Platform 25 is fixedly secured to supports 26 which are connected to chains 66. Accordingly, when said chains are turned about sprockets 68 and 72 platform 25 is raised or lowered depending on the direction of movement of the chains. The platform is held in a fixed position between the mast's spaced support tracks 29 with rollers 82 journaled to the opposite ends of the supports 26.

Brakes 84 are affixed to vehicle frame 16 to coact with shaft 58 and shaft 70 and brake the rotational movement of the shafts and hold the vehicle 10 and its support platform 25 in fixed positions when the brakes are set. While any conventional brake can be used for this purpose it is preferred to use a spring activated, solenoid release-type caliper brake which exerts a pinching action on the shaft when the brake is activated.

Figure 1:
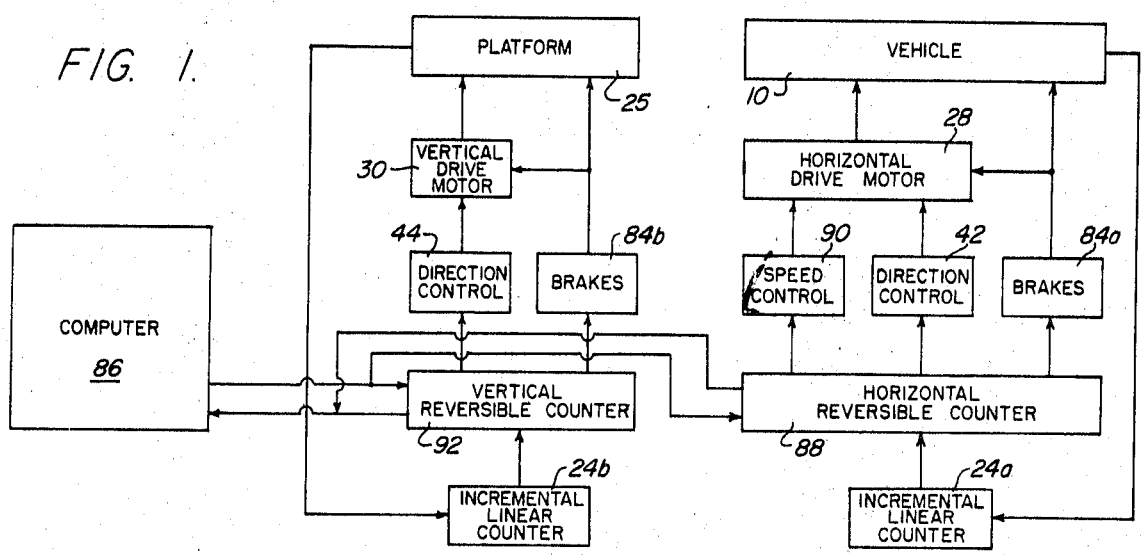
FIG. 1 is a block representation of the control mechanism of this invention.

The operation of vehicle 10 and platform 25 is controlled in the fashion shown in FIG. 1. Computer 86 is programmed to instruct horizontal counter 88 to activate horizontal direction control valve 42 and vehicle drive motor 28 until the vehicle has traveled a predetermined first distance which is measured with horizontal linear counter 24a. When vehicle 10 has traveled this first distance counter 88 activates motor speed control 90 to slow drive motor 28 in preparation for stopping. Then, when the vehicle has traveled a second distance, also measured with linear counter 24a, counter 88 activates vehicle brakes 84a and simultaneously deactivates drive motor 28. In a like fashion, computer 86 is programmed to simultaneously instruct vertical counter 92 to activate vertical direction control valve 44 and drive motor 30 until platform 25 has traveled a predetermined distance which is measured with the vertical linear counter 24b. Counter 92 then sets platform brakes 84b while simultaneously deactivating vertical drive motor 30. When all of the aforementioned functions have been performed horizontal counter 88 and vertical counter 92 signal computer 86 that all of the programmed operations have been completed and that they are ready to receive new operating instructions.

The linear measuring devices 24 of this invention include rollers 94 which are rotatably mounted to vehicle frame 16 and platform support 26 to coact with the longitudinal sides of track 18 and vertical rail 29 respectively. Preferably the rollers form a no-slip contact with the track and rail. This can be achieved by using a roller with a soft rubber peripheral surface so that a high friction no-slip contact is created. In one preferred embodiment of the invention, the roller is a sprocket which coacts with a rack 96 fixedly attached to the longitudinal edge of track 18 and/or rail 29. By using a sprocket and rack construction of this type slippage is completely eliminated. Roller 94 turns drive shaft 98 which drives a conventional encoder such as a rotary transducer 100 that produces a predetermined number of voltage pulses during each revolution of shaft 98. Accordingly, by determining the distance roller 94 travels along its coacting drive surface, e.g., along the longitudinal edge of a rail 18, for each roller revolution, the number of encoder pulses can easily be equated to distance. A suitable encoder which can be commercially obtained for use in this invention is the Data Tech Optican Encoder sold by Data Technology Inc. of Watertown, Mass.

Figure 6:
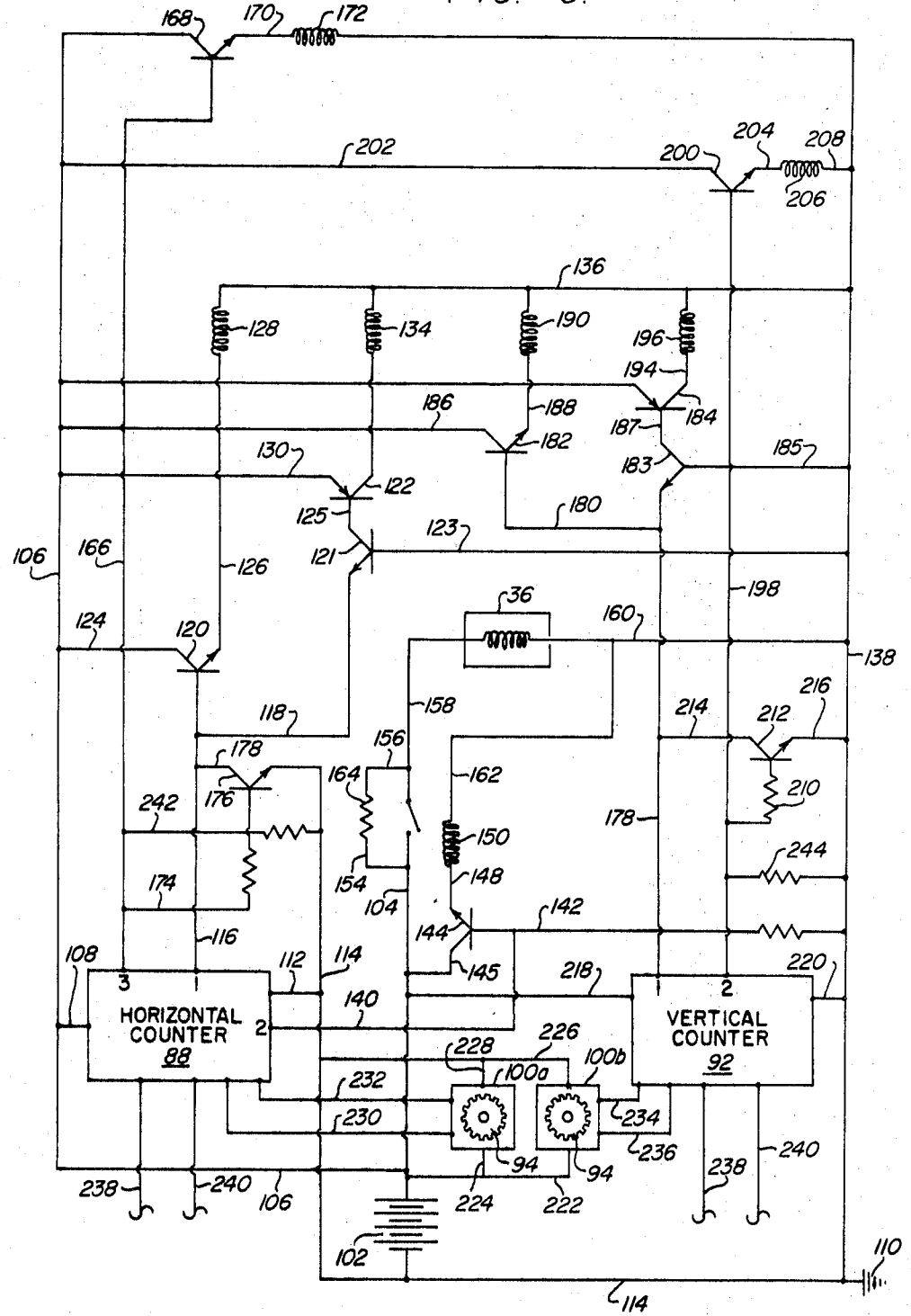
FIG. 6 is a schematic circuit diagram of the control mechanism of this invention.

A schematic circuit diagram of the control mechanism of this invention is illustrated in FIG. 6. As shown, horizontal counter 88 is electrically connected to a conventional power source 102 with conductors 104, 106, and 108 and to ground 110 with lines 112 and 114. Counter 88 is a conventional reversible one such as the number K220 counter sold by the Digital Equipment Corp. of Maynard, Mass. The counter 88 is programmed with computer 86, not shown in FIG. 6, to activate vehicle drive motor 28 in either a forward or reverse direction until the vehicle has moved a predetermined distance. For example, the counter could be instructed to activate motor 28 until it has received a predetermined number of positive voltage pulses from horizontal encoder 100a which would activate vehicle 10 in a forward direction, or conversely, the counter 88 could be instructed to activate motor 28 until it has received a predetermined number of negative voltage pulses which would reverse the direction of movement of the vehicle. If counter 88 receives the first-described signal a positive voltage output is transmitted by the counter along line 116 to the base NPN transistor 120 and along lines 116 and 118 to the emitter of NPN transistor 121. The positive voltage forward biases transistor 120 thereby allowing current through the transistor's collector to its emitter from line 124. From the transistor's emitter the current is directed along line 126 to solenoid coil 128 of direction control valve 42 which urges the valve to move from its closed C position to its open B position thereby activating hydraulic motor 28 to move vehicle 10 in a forward direction along track 18. If, on the other hand, horizontal counter 88 is commanded to activate motor 28 until vehicle 10 has moved a predetermined number of negative pulses, a negative voltage is applied to the base of transistors 120 and to the emitter of transistor 122. In this case, since the base of transistor 121 is connected with lines 123, 138 and 114 to ground the transistor 121 is forward biased which allows current along line 125 to the base of PNP transistor 122 thereby allowing current from line 130 through the emitter and collector of transistor 122 and from thence along line 132 to solenoid coil 134 which urges control valve 42 to move to its open C position. When this occurs motor 28 operates in its reverse direction. From solenoid coils 128 and 132 current returns along lines 136, 138, and 114 to ground 110.

The vehicle drive motor 36 is powered with current from source 102 along line 104, through normally closed switch 152, and from thence along line 158 to said motor 36. From motor 36 the current returns to ground along lines 160, 138 and 114. After the vehicle 10 has traveled a predetermined distance, but prior to reaching its final destination, a second positive voltage is produced by counter 88 which is transferred along lines 140 and 142 to the base of NPN transistor 144 which forward biases said transistor thereby allowing current from lines 104 and 145 through the transistor's collector and emitter and from thence along line 148 to switching coil 150 which urges switch 152 to open. When this occurs, current travels along line 154, through resistor 164, and along lines 156 and 158 to motor 36 to thereby reduce the speed of said motor in preparation for stopping.

When the final predetermined number of voltage pulses has been received by counter 88 from encoder 100a a third positive voltage is produced by the counter to activate brakes 84a and deactivate drive motor 28. This voltage is transmitted along line 166 to the base of NPN transistor 168 which forward biases said transistor thereby allowing current from line 106 through the transistor's collector and emitter and from thence along line 170 to solenoid coil 172 of brake 84a which sets said brake and stops the movement of the vehicle 10. Current is carried from coil 172 back to ground 110 along lines 138 and 114. In addition, the voltage produced by the counter is transmitted along resistored line 124 to the base of NPN transistor 176 which forward biases said transistor thereby allowing current from line 178 through the collector and emitter of said transistor 176, and from thence to ground along line 114. When this occurs, the voltage applied to the bases of transistors 120 and 122 is at ground and the switches transistor is reverse biased which deactivates solenoid 128 and 134 and permits valve 42 to move to its closed C position.

Vertical counter 92 is similarly programmed to transmit either a negative or a positive voltage along lines 178 and 180 to the base of NPN transistor 182 and the emitter of transistor 183. If a positive voltage is applied to the transistors current is carried along line 186, through the collector and emitter of transistor 182, and from thence along line 188 to solenoid coil 190 which urges valve 44 to move to its open B position. If the voltage is a negative one, NPN transistor 183, which has its base connected to ground 110 with lines 185, 138 and 114, is forward biased which forces current along line 187 connected to the base of PNP transistor 184 and forward biases this transistor. When thus biased current passes along line 194 to solenoid coil 196 which urges control valve 44 to move to its A position. From coils 190 and 196 current is carried along lines 136 and 138 back to the return line 114.

When encoder 100b has transmitted a predetermined number of voltage pulses to counter 92 a positive activation voltage is produced by said counter which is transmitted along line 198 to the base of NPN transistor 200 to forward bias said transistor and allow current to pass from line 202, through the transistor's collector and emitter, and from thence along line 204 to solenoid coil 206 which activates vertical brake 84b to stop the movement of platform 25. From coil 206 current is carried along lines 208, 138, and 114 to ground. In addition to activating brake 84b, the second voltage produced by counter 92 is transmitted along resistored line 210 to the base of NPN transistor 212 to forward bias said transistor and allow current to be carried along lines 178 and 214 through the collector and emitter of transistor 212, and from thence along lines 216, 138, and 114 to ground. When this occurs transistors 182 and 184 are reverse biased and solenoid coils 190 and 196 are deactivated.

Vertical counter 92 is electrically connected to source 102 with conductors 104 and 218 and it is connected to ground with lines 220, 138, and 114. Similarly, encoders 100a and 100b are connected to source 102 with lines 222 and 224 and to ground with lines 226, 228, and 114. The positive voltage pulse produced by encoder 100a are transmitted to counter 88 along lines 230 for register and the negative pulses are transferred along line 232. Similarly, the positive pulses of encoder 100b are transmitted to vertical counter 92 along lines 234 and the negative pulses are transmitted to the counter along line 236. The counters are electrically connected to computer 86 for receiving their operating instructions with common lines 238 and 240.

After each of the counters have performed their programmed functions, the three voltage outputs of horizontal counter 88 and the two voltage outputs of vertical counter 92 are terminated in preparation for receiving their operating instructions with common lines 238 and 240.

After each of the counters have performed their programmed functions, the three voltage outputs of horizontal counter 88 and the two voltage outputs of vertical counter 92 are terminated in preparation for receiving a new set of instructions from computer 86. when this occurs, the output of the counters are returned to ground through resistored lines 142, 242, and 244. The system is then ready to receive another set of operating instructions.

The computer 86 of this invention is a digital type such as the P.D.P. 8/I digital computer sold by the Digital Equipment Corp. Maynard, Mass. In using the computer in connection with the control mechanism of this invention the location of each warehouse item to be stored is programmed into the computer. Then when a particular item is to be stored or retrieved the appropriate data is fed into the computer which thereupon determines the distance and direction that the vehicle and its platform must travel to be in the proper loading or unloading position. This information is then converted to positive or negative voltage pulses of the type produced by encoders 100a and 100b and fed into counters 88 and 92. The counters then activate drive motors 28 and 30 and control their operation as herein described.

It is to be noted that some conventional reversible counters do not produce a continuous control voltage when predetermined conditions are reached but instead only produce a voltage pulse. The circuit herein described can be modified to accommodate counters of this type by replacing the transistor in the circuit with silicon controlled rectifiers.

Whereas there is here illustrated and specifically described a certain preferred construction which is presently regarded as the best mode of carrying out the invention, it should be understood that various changes can be made and other construction adopted without departing from the inventive subject matter particularly pointed out and claimed.

I claim:

1. A control mechanism for a wheeled material carrying vehicle having an elevator platform; which comprises track means mounted on a fixed support for controlling the direction of movement of said vehicle; first roller means rotatably mounted to said vehicle to coact with said track means and be rotated therealong as said vehicle moves along said track; drive means attached to said vehicle for propelling said vehicle along said track; first counter means driven with said first roller means for counting the revolutions of said roller means when said vehicle is moved along said track; means for moving said elevator platform along a vertical path relative to said vehicle; second roller means guiding said platform in said vertical path; second counter means associated with said second roller means for counting the revolutions of said second roller means when said platform is moved up and down; vehicle brake means for braking the movement of said vehicle; platform brake means for braking the movement of said platform; and activation circuit means electrically connected to said first and second counter means and both said brake means for setting said brake means when said counter means have counted a predetermined number of roller revolutions.

2. The control mechanism of claim 1 wherein a longitudinally extending rack is attached to said track means and said first roller means is a sprocket which coacts with said rack.

3. The control mechanism of claim 2 wherein said track means is mounted on a warehouse floor.

4. The control mechanism of claim 3 wherein each counter means comprises a rotary transducer, driven by the respective roller means, each transducer being electrically connected to an electronic counter which counts the voltage pulses produced by said rotary transducer.

5. The control mechanism of claim 4 wherein said activation circuit means comprises digital computer means for programming said electronic counters to activate said brake means when a predetermined number of voltage pulses have been transmitted to said counters by said rotary transducer.

6. The control mechanism of claim 5 wherein circuit means are electrically connected to said electronic counter and said vehicle drive means for deactivating said drive means and elevator moving means when said brake means are set.

7. The control mechanism of claim 6 wherein said vehicle drive means are reversible for driving said vehicle in forward and reverse directions along said track means.

8. The control mechanism of claim 7 wherein the operation of said drive means and elevator moving means is controlled by said digital computer means.